US010545388B2

(12) United States Patent
Gila et al.

(10) Patent No.: US 10,545,388 B2
(45) Date of Patent: Jan. 28, 2020

(54) DISPLAY DEVICE (71) Applicant: Hewlett-Packard Development Company, L.P., Fort Collins, CO (US)

(72) Inventors: Omer Gila, Palo Alto, CA (US); Henryk Birecki, Palo Alto, CA (US); Napoleon J Leoni, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/114,401

(22) PCT Filed: Jan. 31, 2014

(86) PCT No.: PCT/US2014/014307
§ 371 (c)(1),
(2) Date: Jul. 27, 2016

(87) PCT Pub. No.: WO2015/116211
PCT Pub. Date: Aug. 6, 2015

(65) Prior Publication Data
US 2016/0342063 A1 Nov. 24, 2016

(51) Int. Cl.
*G02B 26/00* (2006.01)
*G02F 1/03* (2006.01)
*G02F 1/07* (2006.01)
*G02F 1/167* (2019.01)
*G02F 1/1333* (2006.01)
(Continued)

(52) U.S. Cl.
CPC ............ *G02F 1/167* (2013.01); *G02F 1/1345* (2013.01); *G02F 1/13338* (2013.01); *G09G 3/344* (2013.01); *G02F 1/1676* (2019.01); *G02F 2202/22* (2013.01); *G09G 2300/0426* (2013.01); *G09G 2380/02* (2013.01)

(58) Field of Classification Search
CPC .. G02F 1/167; G02F 1/1345; G02F 1/133348; G02F 1/13338; G02F 2001/1676; G02F 2202/22; G02F 1/133305; G02F 1/1334; G02F 1/1343; G02F 2202/28; G02F 2001/1672
USPC ................ 359/237, 242, 265–267, 270–273, 359/290–292, 295, 296, 298
See application file for complete search history.

(56) References Cited

U.S. PATENT DOCUMENTS 5,866,284 A    2/1999   Vincent
6,333,754 B1   12/2001   Oba et al.
(Continued)

FOREIGN PATENT DOCUMENTS

KR      20080085263 A    9/2008

OTHER PUBLICATIONS

High reflectivity electrofluidic pixels with zero-power grayscale operation S. Yang, 1 K. Zhou, 2 E. Kreit, 1 and J. Heikenfeld1, a Novel Devices Laboratory School of Electronics and Computing Systems, University of Cincinnati.

*Primary Examiner* — Brandi N Thomas
(74) *Attorney, Agent, or Firm* — Dicke Billig & Czaja PLLC (57) ABSTRACT

A display device includes an electronic paper display imageable by receiving charges on an imaging surface of the electronic paper display, a ground electrode, and a ground access stripe. The ground electrode is opposite to the imaging surface of the electronic paper display. The ground access stripe is on a surface of the display device and electrically coupled to the ground electrode.

20 Claims, 6 Drawing Sheets (51) Int. Cl.
  *G02F 1/1345*  (2006.01)
  *G09G 3/34*  (2006.01)
  *G02F 1/1676*  (2019.01)

(56) References Cited

U.S. PATENT DOCUMENTS

| | | | |
|---|---|---|---|
| 6,396,361 B1 * | 5/2002 | Horio | H01P 1/387 |
| | | | 333/1.1 |
| 6,515,790 B2 | 2/2003 | Miyamoto et al. | |
| 6,982,734 B2 | 1/2006 | Pan et al. | |
| 7,140,550 B2 | 11/2006 | Ramachandran | |
| 7,580,845 B2 | 8/2009 | Burman | |
| 7,789,489 B2 | 9/2010 | Matsuzoe | |
| 8,018,410 B2 | 9/2011 | Schmitz et al. | |
| 8,144,388 B2 | 3/2012 | Ogawa | |
| 8,264,454 B2 | 9/2012 | Kim et al. | |
| 8,279,167 B2 | 10/2012 | Cato | |
| 8,514,256 B2 | 8/2013 | Ogawa et al. | |
| 8,545,302 B2 | 10/2013 | Wu | |
| 2002/0018042 A1 | 2/2002 | Albert et al. | |
| 2003/0067427 A1 | 4/2003 | Comiskey et al. | |
| 2005/0134550 A1 | 6/2005 | Schmitz | |
| 2006/0017659 A1 | 1/2006 | Ogawa et al. | |
| 2006/0125778 A1 | 6/2006 | Apte | |
| 2006/0192751 A1 | 8/2006 | Miyasaka et al. | |
| 2007/0045399 A1 | 3/2007 | Martin | |
| 2008/0297878 A1 | 12/2008 | Brown et al. | |
| 2010/0007942 A1 | 1/2010 | Oikawa et al. | |
| 2011/0181532 A1 | 7/2011 | Pan | |
| 2011/0254431 A1 | 10/2011 | Hirakawa | |
| 2011/0285755 A1 | 11/2011 | Umezaki | |
| 2011/0298760 A1 | 12/2011 | Gila et al. | |
| 2012/0206341 A1 * | 8/2012 | Gila | B41J 3/4076 |
| | | | 345/156 |
| 2012/0274616 A1 | 11/2012 | Scribner et al. | |
| 2012/0275014 A1 * | 11/2012 | Ogawa | G02B 26/026 |
| | | | 359/296 |
| 2012/0320001 A1 | 12/2012 | Gila et al. | |
| 2013/0003162 A1 | 1/2013 | Leoni | |
| 2013/0114126 A1 | 5/2013 | Kim et al. | |
| 2013/0235446 A1 | 9/2013 | Leoni et al. | |
| 2014/0210805 A1 | 7/2014 | Birecki et al. | |
| 2014/0239068 A1 | 8/2014 | Park | |
| 2014/0253426 A1 | 9/2014 | Leoni et al. | |

* cited by examiner

DISPLAY DEVICE

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Electronic paper ("e-paper") is used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those that are used in printing allows the e-paper to be read at a wide range of angles and lighting conditions, including full sunlight. The use of ambient light also eliminates the need for illumination produced by the device, such as a backlight. This minimizes the power used by the e-paper. In addition, the e-paper does not use power to maintain the image. Once the image is written, the image remains on the e-paper for an extended period of time or until the e-paper is rewritten. Thus, a typical e-paper primarily uses power for changing the optical state of the e-paper.

E-paper is typically written by generating a charge on a surface in proximately to a layer of microcapsules that contain charged pigment particles. The charge on the surface attracts or repels the charged pigment particles in the microcapsules to create the desired image. To write to e-paper, however, a writing module used to write to the e-paper has to maintain a connection to a ground return path for the e-paper.

The following disclosure describes several examples of e-paper display devices that enable a secure electrical connection between a writing module and a ground return path of an e-paper display device. The example display devices also provide for controlled motion through a writing module, provide for proper spacing between the display devices and a writing module, and provide mechanical robustness beyond that provided by the e-paper alone.

Accordingly, a display device, such as a gift card, prepaid card, credit card, shelf tag, boarding pass, shipping label, etc., includes a passive electronic paper display. The electronic paper display is imageable by receiving charges on an imaging surface of the electronic paper display from a writing module. The display device includes a ground electrode opposite to the imaging surface of the electronic paper display. The display device includes a ground access stripe on a surface of the display device. The ground access stripe is electrically coupled to the ground electrode. During writing of the electronic paper display, a conductive roller or brush of the writing module makes contact with the ground access stripe to provide a ground return path that allows charges received on the imaging surface to flow to the ground electrode as the writing module and the display device are moved relative to each other.

Figure 1A:
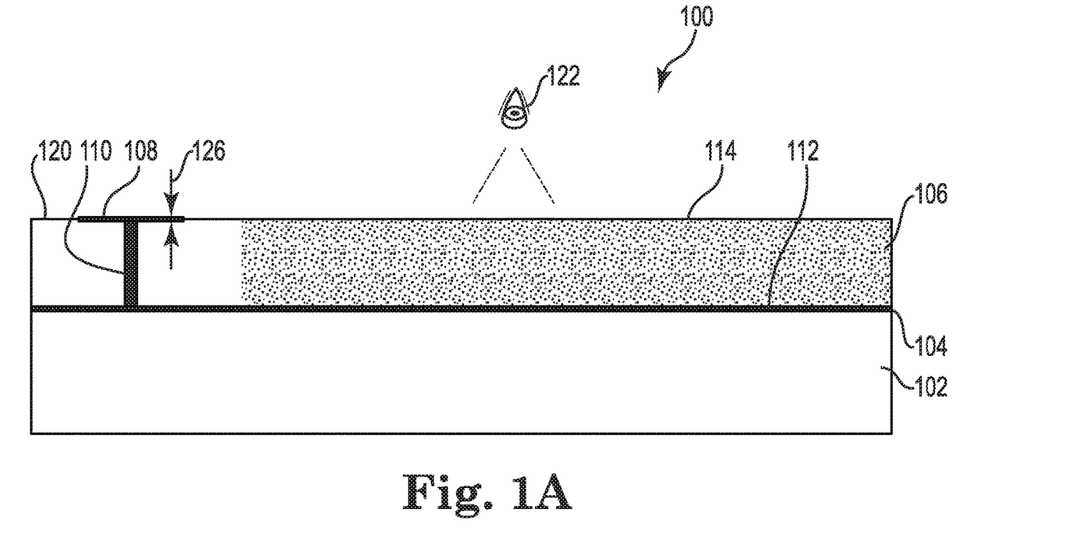
FIG. 1A illustrates a cross-sectional view of one example of a display device.
Figure 1B:
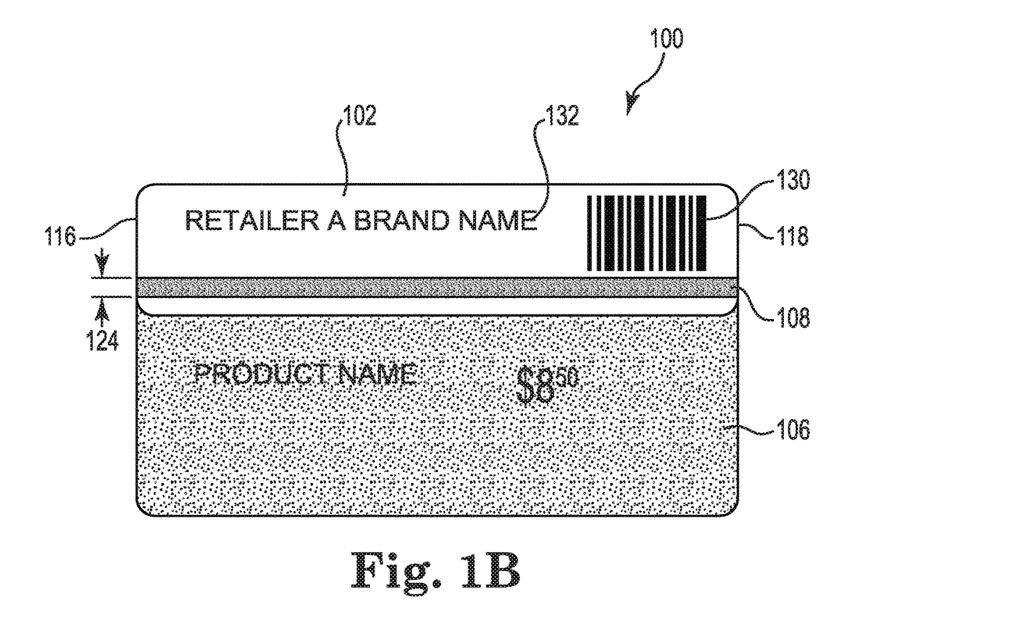
FIG. 1B illustrates a top view of one example of the display device illustrated in FIG. 1A.

FIG. 1A illustrates a cross-sectional view and FIG. 1B illustrates a top view of one example of a display device 100. Display device 100 includes a support structure 102, a ground electrode 104, an electronic paper ("e-paper") display 106, and a ground access stripe 108. Ground access stripe 108 is electrically coupled to ground electrode 104 through a conductor 110 within support structure 102. In this example, the viewing side of display device 100 is indicated by a viewer 122.

E-paper display 106 includes an imaging surface 114 and a surface 112 opposite imaging surface 114. Surface 112 contacts ground electrode 104. Ground electrode 104 and e-paper display 106 are mounted on support structure 102 such that imaging surface 114 of e-paper display 106 is exposed. E-paper display 106 includes an active layer that switches color when a magnetic field or electrical charges are applied to imaging surface 114. In one example, the active layer contains a switchable pigment or die combination. A resin or polymer may be used to encapsulate the active layer. In addition, e-paper 106 may include a functional coating on the imaging surface 114. In one example, e-paper display 106 has a thickness between 70 μm and 300 μm. One example of e-paper 106 is further described below with reference to FIG. 3.

Ground electrode 104 provides a counter-electrode for the imaging of e-paper display 106 by a writing module. Ground electrode 104 allows counter charges to flow to ground electrode 104 from a writing module. Thus, display device 100 remains basically charge neutral despite charges being ejected onto imaging surface 114. Without a connection between ground electrode 104 and the writing module, no appreciable amount of charges can be ejected onto imaging surface 114 and thus no information can be written to display device 100. Ground electrode 104 can be composed of a transparent conductive material, such as indium tin oxide, or an opaque conductive material. In one example, ground electrode 104 has a thickness between 5 nm and 1 mm.

Support structure 102 can be composed of a transparent material or an opaque material. Support structure 102 can be composed of polyester, plastic, glass, transparent Mylar, or other suitable material. In one example, support structure 102 is shaped to provide a display device 100 in the form of a gift card, prepaid card, credit card, shelf tag, boarding pass, or shipping label. Support structure 102 can include a bar code 130, text 132, or other suitable information on its surface.

Ground access stripe 108 is arranged on a surface 120 of support structure 102 and is spaced apart from e-paper display 106. Ground access stripe 108 is arranged parallel to a writing direction of e-paper display 106. In one example, ground access stripe 108 is partially or completely embedded within surface 120 of support structure 102. Ground access stripe 108 extends from a first edge 116 of support structure 102 to a second edge 118 of support structure 102 opposite first edge 116. In this example, ground access stripe 108 and imaging surface 114 of e-paper display 106 are on the same side of display device 100. In other examples, ground access stripe 108 and imaging surface 114 of e-paper display 106 can be on opposite sides of display device 100.

Ground access stripe 108 is composed of any suitable electrically conductive material, such as a metal or a printed layer (e.g., digitally printed or screen printed) of conductive ink. In one example, ground access stripe 108 and conductor 110 are composed of a conductive polymer. In one example, the width, indicated at 124, of ground access stripe 108 is between 1 mm and 15 mm and the thickness, indicated at 126, is between 5 nm and 1 mm. In the example where ground access stripe 108 and conductor 110 are composed of a conductive polymer, the entire support structure 102 may be composed of the conductive polymer. In one example, the conductive polymer has a resistivity between $10^8$ Ohm-cm and $10^{11}$ Ohm-cm, which is sufficient for writing and erasing currents between 25 µA and 100 µA.

Figure 2A:
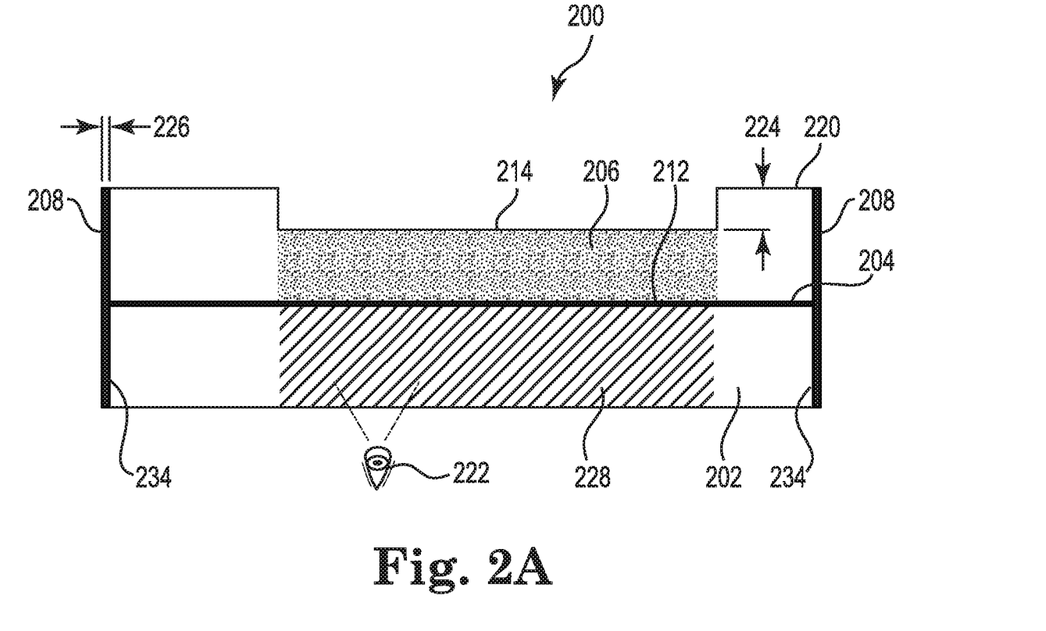
FIG. 2A illustrates a cross-sectional view of one example of a display device.
Figure 2B:
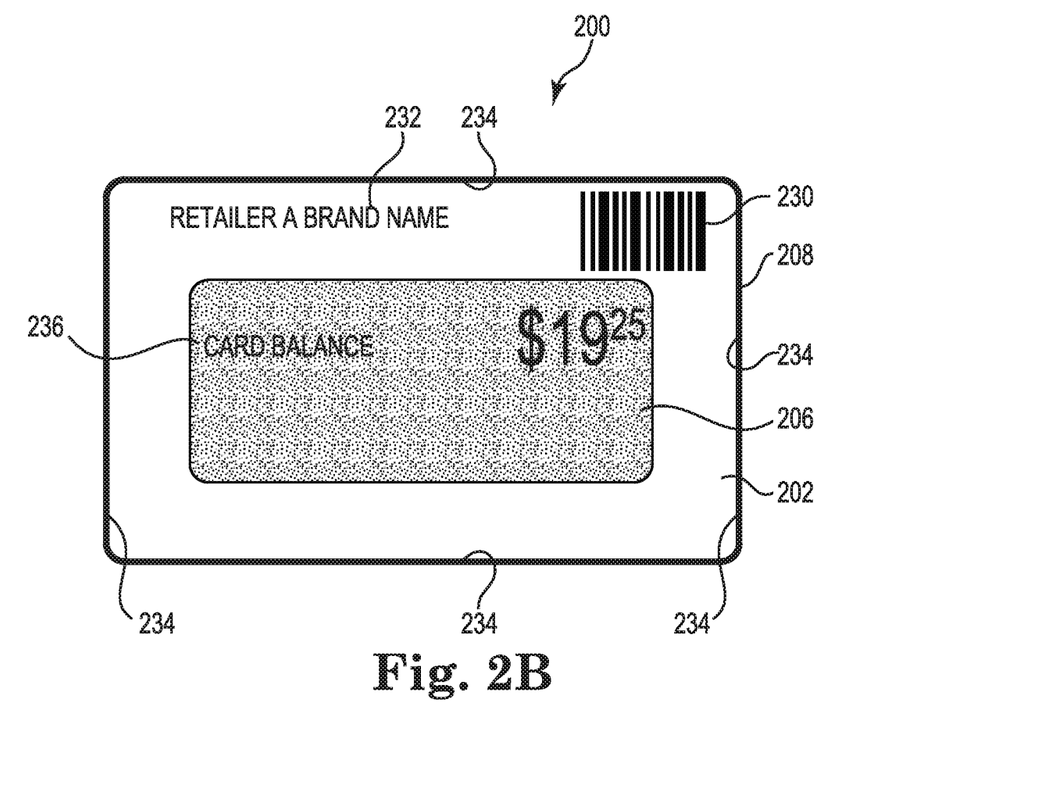
FIG. 2B illustrates a top view of one example of the display device illustrated in FIG. 2A.

FIG. 2A illustrates a cross-sectional view and FIG. 2B illustrates a top view of one example of a display device 200. Display device 200 includes a support structure 202, a structural window 228, a ground electrode 204, an e-paper display 206, and a ground access stripe 208. Ground access stripe 208 is electrically coupled to ground electrode 204. In this example, the viewing side of display device 200 is indicated by a viewer 222. E-paper display 206 includes an imaging surface 214 and a surface 212 opposite imaging surface 214. Surface 212 contacts ground electrode 204. Ground electrode 204 and e-paper display 206 are surrounded by support structure 202.

Structural window 228 extends through support structure 202 so that a viewer 222 can see the image (e.g., image 236) on e-paper display 206. Structural window 228 can be an air gap or be composed of glass, transparent plastic, or other suitable transparent material. Support structure 202 defines a frame having a thickness indicated at 224 that provides a recessed imaging surface 214 with respect to support structure 202. In one example, the thickness 224 of the frame is between 100 µm and 300 µm.

Ground access stripe 208 is arranged on the outer edge surface 234 of support structure 202 and surrounds support structure 202. Edge surface 234 of support structure 202 is substantially orthogonal to imaging surface 214. Ground access stripe 208 is composed of any suitable electrically conductive material, such as a metal or a printed layer (e.g., digitally printed or screen printed) of conductive ink. In one example, ground access stripe 208 is composed of a conductive polymer. In one example, ground access stripe 208 has a thickness, as indicated at 226, between 5 nm and 1 mm. In the example where ground access stripe 208 is composed of a conductive polymer, the entire support structure 202 may be composed of the conductive polymer. In one example, the conductive polymer has a resistivity between $10^8$ Ohm-cm and $10^{11}$ Ohm-cm, which is sufficient for writing and erasing currents between 25 µA and 100 µA.

Ground access stripe 208 is likely to be contacted by a user when display device 200 is handled. This contact between a user and ground access stripe 208 provides a positive consequence in that if the user is storing any electrostatic charge, display device 200 will be equipotential with the user, thus minimizing the chance of accidental image modifications due to electrostatic discharges.

Figure 3:
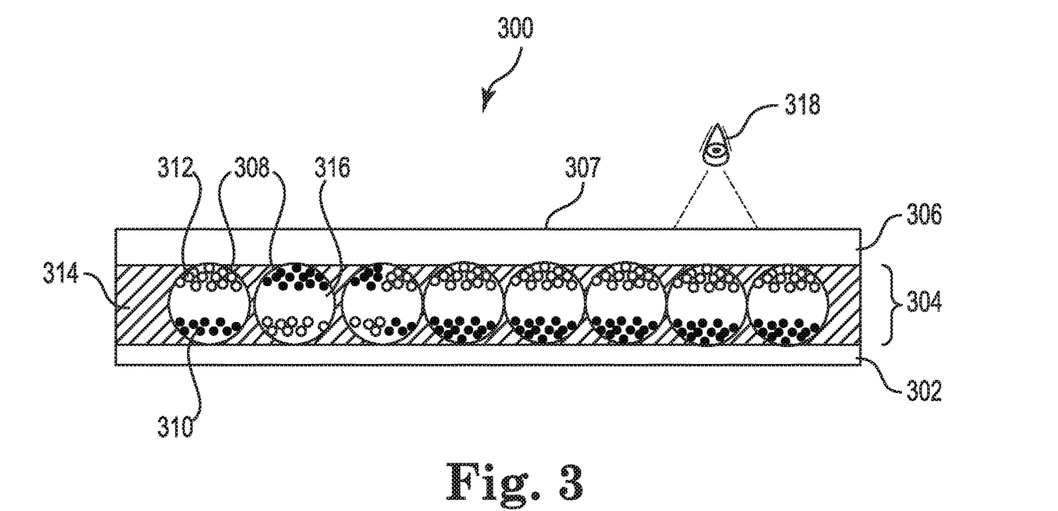
FIG. 3 illustrates a cross-sectional view of one example of an electronic paper ("e-paper") display.

FIG. 3 illustrates a cross-sectional view of one example of an e-paper display 300. In one example, e-paper display 300 is used for e-paper display 106 or 206 previously described and illustrated with reference to FIGS. 1A-1B, and 2A-2B, respectively. E-paper display 300 includes a ground electrode 302, an active layer 304, and a transparent charge receiving layer 306. Active layer 304 includes microcapsules 308 encapsulated by a resin or polymer 314. In one example, each microcapsule 308 includes black particles 310 and white particles 312 suspended in a fluid medium 316. Surface 307 of charge receiving layer 306 provides the imaging surface for e-paper display 300 and is also the viewing side for a viewer 318 in this example.

Ambient light is transmitted through charge receiving layer 306, strikes microcapsules 308, and is reflected back to the viewer 318. When white particles 312 of a microcapsule 308 are located near charge receiving layer 306, the microcapsule appears white to the viewer 318. When black particles 310 of a microcapsule 308 are located near charge receiving layer 306, the microcapsule appears black to the viewer 318. The particles 310 and 312 have opposite charges. For example, black particles 310 can be positively charged particles, and white particles 312 can be negatively charged particles. Various shades of gray can be created by varying the arrangement of alternating microcapsules with white and black particles located near charge receiving layer 306 to produce halftoning.

Microcapsules 308 exhibit image stability using chemical adhesion between particles and/or between the particles and the microcapsule surface. For example, microcapsules 308 can hold text and images indefinitely without using electricity, while allowing the text or images to be changed later.

The structure, materials, and dimensions of the various layers and components of e-paper display 300 can be adapted to specific design criteria. In one example, the transparent charge receiving layer 306 can be composed of a transparent polymer and can have a thickness between 50 µm and 250 µm. The transparent charge receiving layer 306 can also be composed of a material that holds charges or is porous or semi-porous to charges and/or ions.

The diameter of each microcapsule 308 is substantially constant within e-paper display 300 and can be in one example between 20 µm and 100 µm, such as 50 µm. Conductive ground electrode 302 can be composed of a transparent conductive material, such as indium tin oxide, or an opaque material. In one example, ground electrode 302 has a thickness between 10 nm and 1 mm, or larger depending on how e-paper display 300 is to be used.

In other examples, E-paper display 300 has a variety of other configurations. For example, each microcapsule 308 may include black particles suspended in a white colored fluid. The black particles can be positively charged particles or negatively charged particles. One or more microcapsules form a pixel of black and white images displayed on e-paper display 300. The black and white images are created by placing black particles near or away from charge receiving layer 306. For example, the microcapsules with black particles located away from charge receiving layer 306 reflect white light, corresponding to a white portion of an image displayed on e-paper display 300. In contrast, the microcapsules with black particles located near charge receiving layer 306 appear black to a viewer 318 corresponding to a black portion of the image displayed on e-paper display 300. Various shades of gray can be created by using halftoning with black particles located near or away from charge receiving layer 306.

Charge receiving layer 306 may be tinted with alternating blue, red, and green regions. Adjacent blue, red, and green regions form color pixels. Color images are created by placing different combinations of white or black particles near charge receiving layer 306. For example, the microcapsules of a color pixel with white particles located near the red and green regions of charge receiving layer 306 reflect red and green light from e-paper display 300. The viewer 318 will perceive this combination as a yellow pixel. When the black particles in the microcapsules are located near charge receiving layer 306, that color pixel will appear black to the viewer 318. Additionally or alternatively, the black particles 310 of each microcapsule can be replaced by blue, red, or green positively or negatively charged particles. The particles can be used alone or in combination with a tinted charge receiving layer 306 to create a desired color image.

Figure 4:
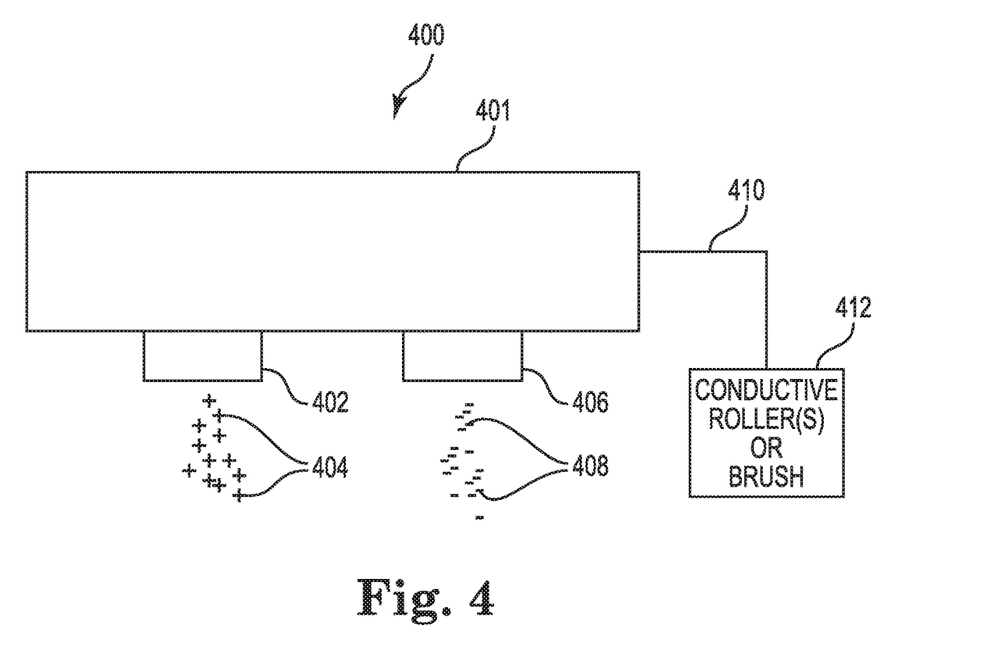
FIG. 4 illustrates one example of a writing module.

FIG. 4 illustrates one example of a writing module 400. Writing module 400 can be used to write information to display device 100 and/or 200 previously described and illustrated with reference to FIGS. 1A-1B and 2A-2B, respectively. Writing module 400 includes an imaging unit 401 including a corona writing unit 402 and a corona erasing unit 406, and conductive roller(s) or brush 412. Conductive roller(s) or brush 412 is electrically coupled to imaging unit 401 through signal path 410. Corona writing unit 402 and corona erasing unit 406 are located on the same side of imaging unit 401.

Corona erasing unit 406 selectivity ejects negative ions 408 toward an imaging surface of an e-paper display to erase any text and/or images on the e-paper display by repelling the negatively charged particles and/or by attracting the positively charged particles within the e-paper display toward the imaging surface. Corona writing unit 402 selectively ejects positive ions 404 toward an imaging surface of an e-paper display to write desired text and/or images on the e-paper display by repelling the positively charged particles and/or by attracting the negatively charged particles within the e-paper display toward the imaging surface.

Conductive roller(s) or brush 412 makes contact with the ground access stripe of a display device during writing of the display device to provide an electrical connection to the ground electrode of the display device. When using conductive roller(s), the roller(s) can also set the spacing between corona writing unit 402 and corona erasing unit 406 and the display device during writing of the display device. The conductive roller(s) are composed of any suitable electrically conductive material, such as a metal or conductive rubber. When using a conductive brush, the brush is composed of any suitable electrically conductive material, such as a metal or carbon.

Figure 5A:
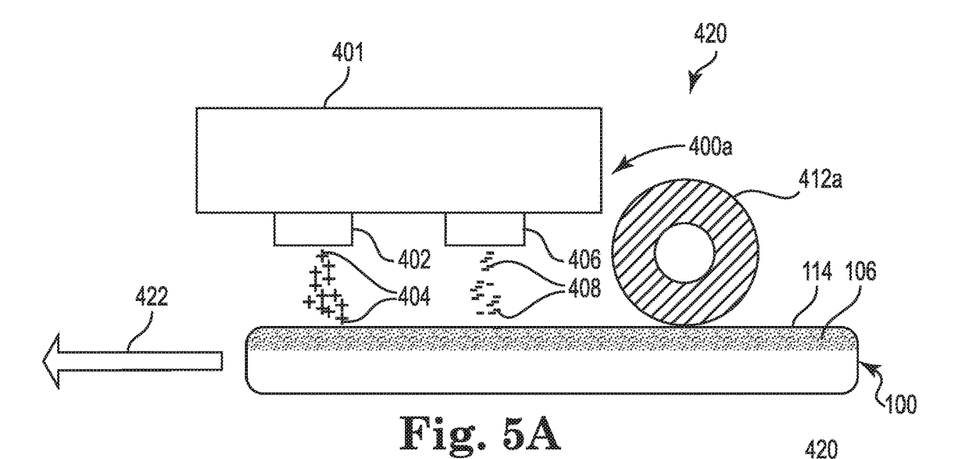
FIGS. 5A-5C illustrate one example of a system including a writing module and a display device.
Figure 5B:
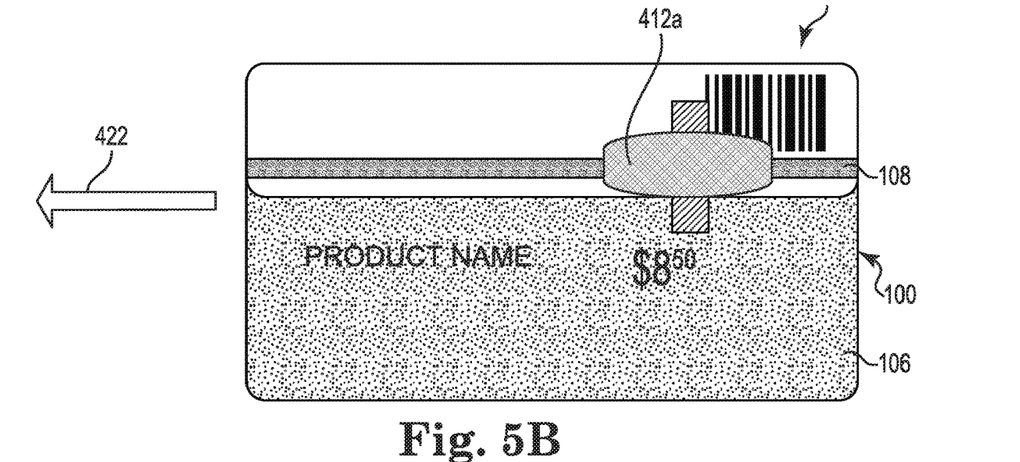
Figure 5C:
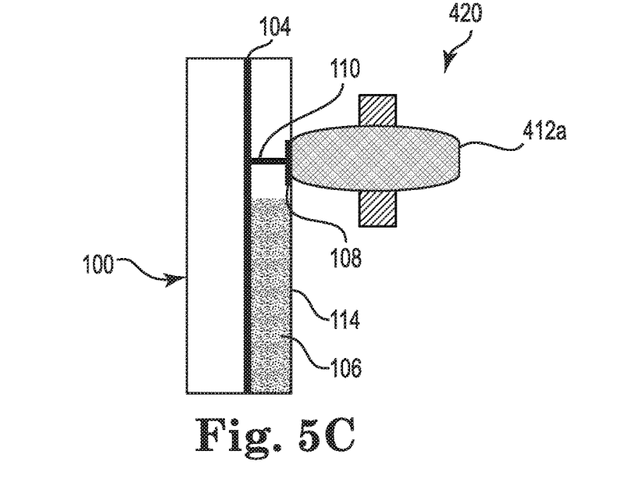

FIGS. 5A-5C illustrate one example of a system 420 including a writing module 400a and a display device 100. Writing module 400a is similar to writing module 400 previously described and illustrated with reference to FIG. 4, and display device 100 was previously described and illustrated with reference to FIGS. 1A-1B. In this example, writing module 400a includes a conductive roller 412a. To write to display device 100, writing module 400a is brought into contact with display device 100 so that conductive roller 412a contacts ground access stripe 108 as best illustrated in the top view of FIG. 5B and the side view of FIG. 5C. Conductive roller 412a electrically couples imaging unit 401 to ground electrode 104 via ground access stripe 108 and conductor 110.

Writing module 400a can be moved in the direction indicated by arrow 422 and display device 100 can be held stationary, display device 100 can be moved in the opposite direction indicated by arrow 422 and writing module 400a can be held stationary, or display device 100 and writing module 400a can be moved simultaneously with respect to each other. While writing module 400a and display device 100 are moved relative to each other, conductive roller 412a maintains contact to ground access stripe 108 during the writing of e-paper display 106.

In this example, e-paper display 106 of display device 100 includes microcapsules including positively charged black particles and negatively charged white particles. Corona erasing unit 406 erases any information stored in the microcapsules prior to writing information with corona writing unit 402. As display device 100 passes under imaging unit 401, corona erasing unit 406 ejects negative ions 408 onto imaging surface 114. The negative ions 408 repel negatively charged white particles away from imaging surface 114 and attract positively charged black particles toward imaging surface 114. By passing corona erasing unit 406 over imaging surface 114, any information previously written to display device 100 is erased by positioning the positively charged black particles near the top of the microcapsules and pushing the negatively charged white particles to the bottom of the microcapsules.

Corona writing unit 402 writes information to the microcapsules. As display device 100 passes under imaging unit 401, corona writing unit 402 selectively ejects positive ions 404 toward imaging surface 114 when a region of display device 100 is to be changed from black to white. The positive ions 404 repel positively charged black particles away from imaging surface 114 and attract negatively charged white particles toward imaging surface 114. By passing corona writing unit 402 over imaging surface 114 and selectively ejecting positive ions onto imaging surface 114, information is written to display device 100 by selectively positioning negatively charged white particles near the top of the microcapsules and selectively pushing the positively charged black particles to the bottom of the microcapsules.

Figure 6A:
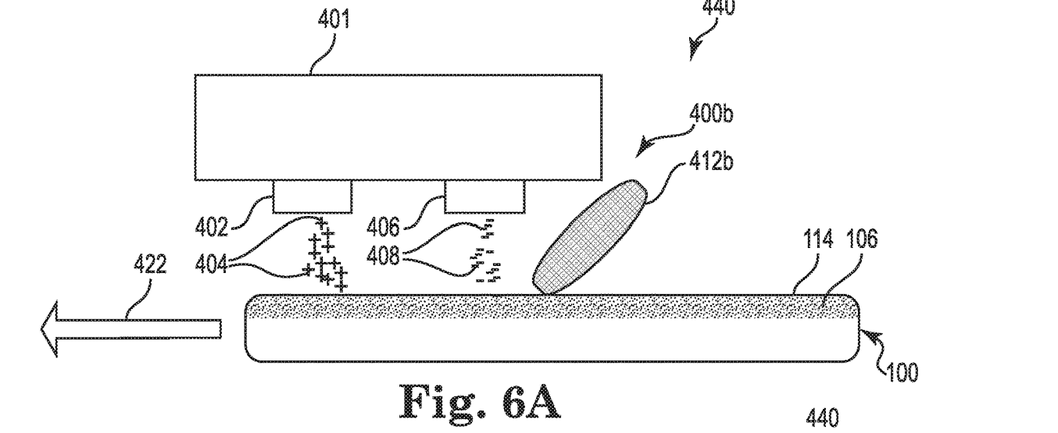
FIGS. 6A-6C illustrate one example of a system including a writing module and a display device.
Figure 6B:
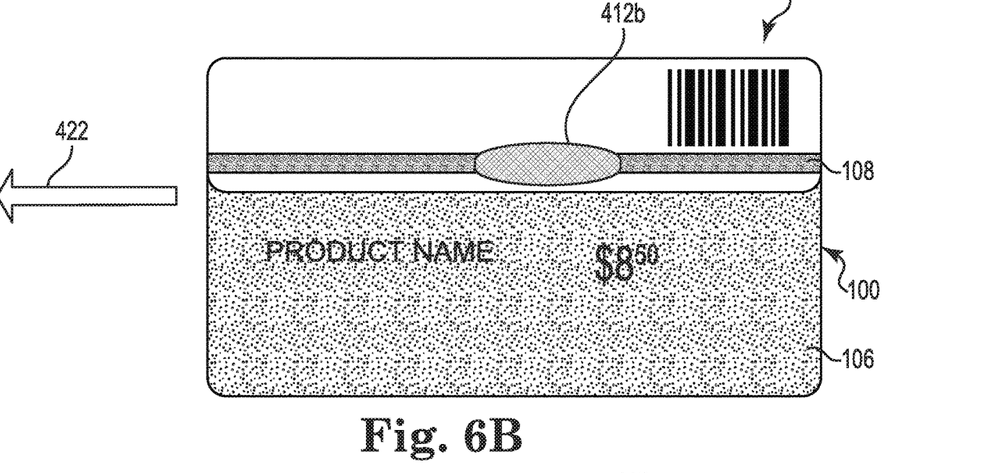
Figure 6C:
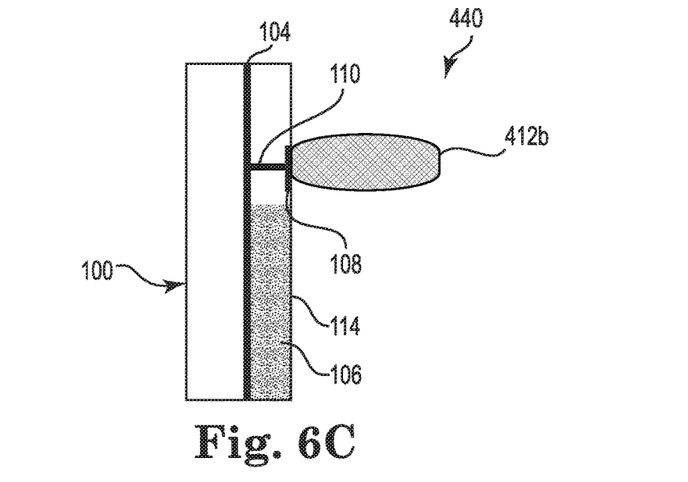

FIGS. 6A-6C illustrate one example of a system 440 including a writing module 400b and a display device 100. Writing module 400b is similar to writing module 400 previously described and illustrated with reference to FIG. 4, and display device 100 was previously described and illustrated with reference to FIGS. 1A-1B. In this example, writing module 400b includes a conductive brush 412b. To write to display device 100, writing module 400b is brought into contact with display device 100 so that conductive brush 412b contacts ground access stripe 108 as best illustrated in the top view of FIG. 6B and the side view of FIG. 6C. Conductive brush 412b electrically couples imaging unit 401 to ground electrode 104 via ground access stripe 108 and conductor 110. System 440 writes to display device 100 similarly to system 420 previously described and illustrated with reference to FIGS. 5A-5C.

Figure 7A:
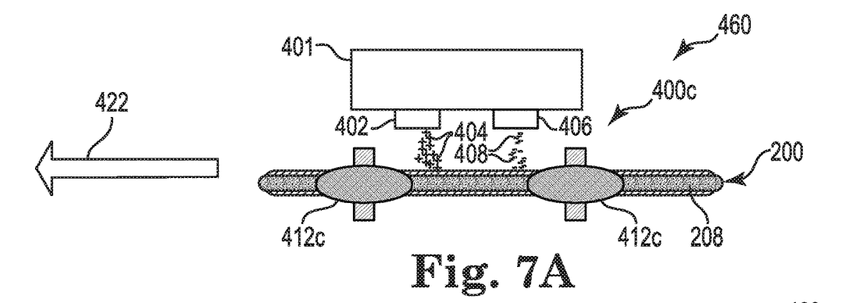
FIGS. 7A-7C illustrate one example of a system including a writing module and a display device.
Figure 7B:
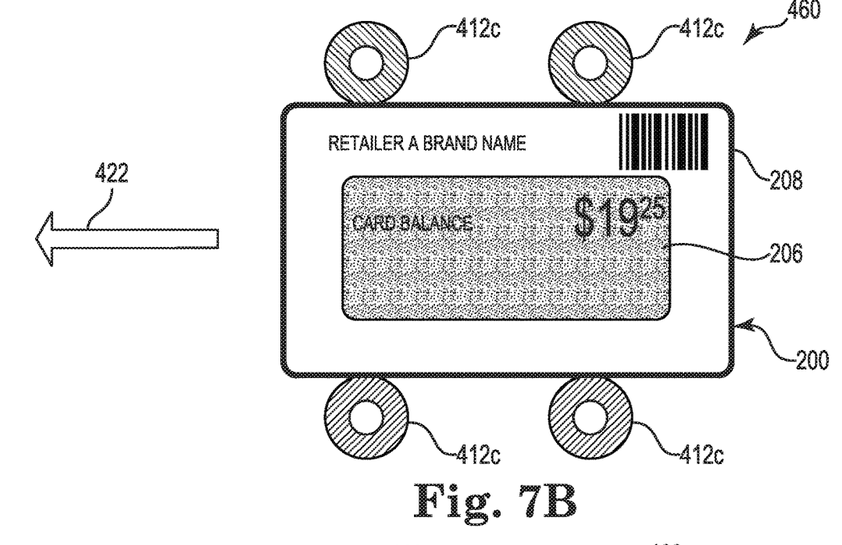
Figure 7C:
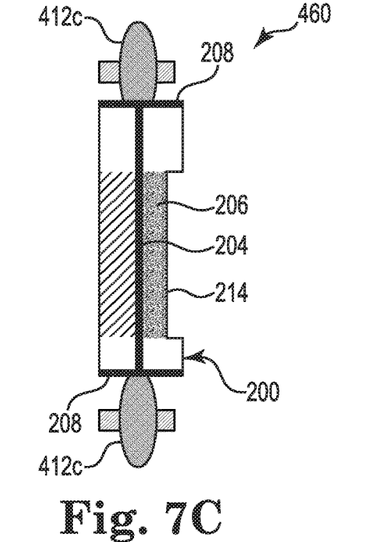

FIGS. 7A-7C illustrate one example of a system 460 including a writing module 400c and a display device 200. Writing module 400c is similar to writing module 400 previously described and illustrated with reference to FIG. 4, and display device 200 was previously described and illustrated with reference to FIGS. 2A-2B. In this example, writing module 400c includes a plurality of conductive rollers 412c. To write to display device 200, writing module 400c is brought into contact with display device 200 so that conductive rollers 412c contact ground access stripe 208 on opposite sides of display device 200 as best illustrated in the top view of FIG. 7B and the side view of FIG. 7C. Conductive rollers 412c electrically couple imaging unit 401 to ground electrode 204 via ground access stripe 208. Conductive rollers 412c also constrain the motion of display device 200 so that the display device travels along the desired path. System 460 writes to display device 200 similarly to system 420 previously described and illustrated with reference to FIGS. 5A-5C.

By including a ground access stripe on a display device, an electrical connection between the writing module and the ground electrode of the display device can be maintained during movement of the writing module and the display device relative to each other. The ground access stripe also improves image robustness of the display device by providing a conductive path to ground to prevent accidental electrostatic discharges from users from altering the image.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A display device comprising:
an electronic paper display imageable by receiving charges on an imaging surface of the electronic paper display;
a ground electrode opposite to the imaging surface of the electronic paper display; and
a ground access stripe on a surface of the display device that allows charges received on the imaging surface during writing of the electronic paper display to flow to the ground electrode, the ground access stripe directly electrically coupled to the ground electrode through a conductor.

2. The display device of claim 1, wherein the ground access stripe is arranged on a same side of the display device as the imaging surface of the electronic paper display.

3. The display device of claim 1, wherein the ground access stripe is arranged on an edge surface of the display device, the edge surface substantially orthogonal to the imaging surface of the electronic paper display.

4. The display device of claim 3, wherein the ground access stripe extends completely around the display device on the edge surface.

5. The display device of claim 1, wherein the ground access stripe comprises a conductive polymer.

6. A display device comprising:
a support structure;
a ground electrode arranged on the support structure;
an electronic paper display arranged on the ground electrode, the electronic paper display imageable by receiving charges on an imaging surface of the electronic paper display; and
a ground access stripe on a surface of the support structure and spaced apart from the electronic paper display that allows charges received on the imaging surface during writing of the electronic paper display to flow to the ground electrode, the ground access stripe directly electrically coupled to the ground electrode through a conductor within the support structure.

7. The display device of claim 6, wherein the ground access stripe extends continuously from a first edge of the display device to a second edge of the display device opposite the first edge.

8. The display device of claim 6, wherein the ground access stripe is arranged on an edge surface of the display device, the edge surface substantially orthogonal to the imaging surface.

9. The display device of claim 6, wherein the ground access stripe prevents disruption of an image of the electronic paper display from electrostatic discharges when a user contacts the ground access stripe.

10. The display device of claim 6, wherein the ground access stripe is parallel to a writing direction of the display device.

11. A system comprising:
a writing module comprising a writing unit and a conductive roller or brush, the writing module to write to a display device, the display device comprising:
a support structure;
a ground electrode arranged on the support structure;
an electronic paper display arranged on the ground electrode, the electronic paper display imageable by receiving charges on an imaging surface of the electronic paper display from the writing unit; and
a ground access stripe arranged on the support structure, the ground access stripe directly electrically coupled to the ground electrode through a conductor within the support structure,
wherein the conductive roller or brush is to contact the ground access stripe to provide a ground return path that allows charges received on the imaging surface to flow to the ground electrode during writing of the electronic paper display as the writing module and display device are moved relative to each other.

12. The system of claim 11, wherein the ground access stripe extends from a first edge of the support structure to a second edge of the support structure opposite the first edge.

13. The system of claim 11, wherein the ground access stripe is arranged on an edge surface of the support structure and completely surrounds the support structure, the edge surface substantially orthogonal to the imaging surface.

14. The system of claim 13, wherein the writing module comprises a conductive roller to contact the ground access stripe on a first side of the display device and a further conductive roller to contact the ground access stripe on a second side of the display device opposite the first side.

15. The system of claim 11, wherein the ground access stripe comprises an electrically conductive ink.

16. The display device of claim 3, wherein the ground access stripe is arranged on a first side of the display device, a second side of the display device, a third side of the display device, and a fourth side of the display device, the second side opposite to the first side, and the fourth side opposite to the third side.

17. The display device of claim 6, wherein the support structure comprises a conductive polymer.

18. The display device of claim 8, wherein the ground access stripe is arranged on a first side of the display device, a second side of the display device, a third side of the display device, and a fourth side of the display device, the second side opposite to the first side, and the fourth side opposite to the third side.

19. The system of claim 11, wherein the ground access stripe is arranged on a first side of the support structure, a second side of the support structure, a third side of the support structure, and a fourth side of the support structure, the second side opposite to the first side, and the fourth side opposite to the third side.

20. The system of claim 11, wherein the support structure comprises a conductive polymer.

* * * * *